US012749009B2

(12) United States Patent
Teofili et al.

(10) Patent No.: US 12,749,009 B2
(45) Date of Patent: Sep. 29, 2026

(54) GENERATING OPTIMIZED MODEL EXPLANATIONS

(71) Applicant: Red Hat, Inc., Raleigh, NC (US)

(72) Inventors: Tommaso Teofili, Rome (IT); Daniele Zonca, Vignate (IT)

(73) Assignee: Red Hat, Inc., Raleigh, NC (US)

( * ) Notice: Subject to any disclaimer, the term of this patent is extended or adjusted under 35 U.S.C. 154(b) by 1147 days.

(21) Appl. No.: 17/557,444

(22) Filed: Dec. 21, 2021

(65) Prior Publication Data

US 2023/0196183 A1 Jun. 22, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2020/0279182 A1 * 9/2020 So .......................... G06N 20/00
2021/0081790 A1 * 3/2021 Krishnan ................. G06N 3/08

OTHER PUBLICATIONS

Madhyastha "On Model Stability as a Function of Random Seed" (Year: 2019).*
Deterministic Local Interpretable Model-Agnostic Explanations for Stable Explainability; Zafar et al.; Mach. Learn. Knowl. Extr. 2021, 3, 525-541. https://doi.org/10.3390/make3030027; https://www.mdpi.com/journal/make; retrieved Nov. 9, 2021 (17 pages).
Faithful and Customizable Explanations of Black Box Models; Lakkaraju et al.; Session 2: Norms and Explanations; AIES' 19, Jan. 27-28, 2019 (8 pages).
Locally Interpretable Models and Effects based on Supervised Partitioning (LIME-SUP); Hu et al.; Jun. 1, 2018 (15 pages).
On Model Stability as a Function of Random Seed; Madhyastha et al.; https://github.com/rishj97/ModelStability; retrieved Nov. 9, 2021 (13 pages).
Statistical stability indices for LIME: obtaining reliable explanations for Machine Learning models; Visani et al.; Nov. 13, 2020 (18 pages).
Defect Reduction Planning (using TimeLIME); Peng et al.; IEEE Transactions on Software Engineering; Feb. 15, 2021 (15 pages).

(Continued)

*Primary Examiner* — Van C Mang
(74) *Attorney, Agent, or Firm* — Kilpatrick Townsend & Stockton LLP

(57) ABSTRACT

Methods and systems for improved optimization of machine learning model explanation processes are provided. In one embodiment, a method is provided that includes generating an approximation model using a model explanation process in order to present one or more relevant features for an output as generated by a model based on an input. Generating the approximation model may include determining a stability measure for a first set of parameter values for the model explanation process. The first set of parameter values to be iteratively adjusted to identify and optimize set of parameter values. The approximation model may then be generated using the model explanation process configured according to the optimize set of parameter values.

20 Claims, 6 Drawing Sheets

(56) References Cited

OTHER PUBLICATIONS

LIME: Ribeiro, Marco Tulio, Sameer Singh, and Carlos Guestrin. ""Why should I trust you?" Explaining the predictions of any classifier." Proceedings of the 22nd ACM SIGKDD international conference on knowledge discovery and data mining. 2016 (10 pages).

Lee, Eunjin, et al. "Developing the sensitivity of LIME for better machine learning explanation." Artificial Intelligence and Machine Learning for Multi-Domain Operations Applications. vol. 11006. International Society for Optics and Photonics, 2019 (3 pages).

* cited by examiner

GENERATING OPTIMIZED MODEL EXPLANATIONS

BACKGROUND

Computerized models (e.g., machine learning models) may be used to perform various types of predictions and/or analyses. In particular, machine learning models may be trained to receive input data from a user and to generate a prediction or analysis based on the received data.

SUMMARY

The present disclosure presents new and innovative systems and methods for optimizing machine learning model explanation processes. In one embodiment, generating an approximation model using the model explanation process. One or more relevant features for an output may be presented based on the approximation model and an input. Generating the approximation model may include determining at least one stability measure of a first set of parameter values for the model explanation process and iteratively adjusting the first set of parameter values to identify an optimized set of parameter values that optimizes the at least one stability measure. The approximation model may be generated using the model explanation process configured according to the optimized set of parameter values.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
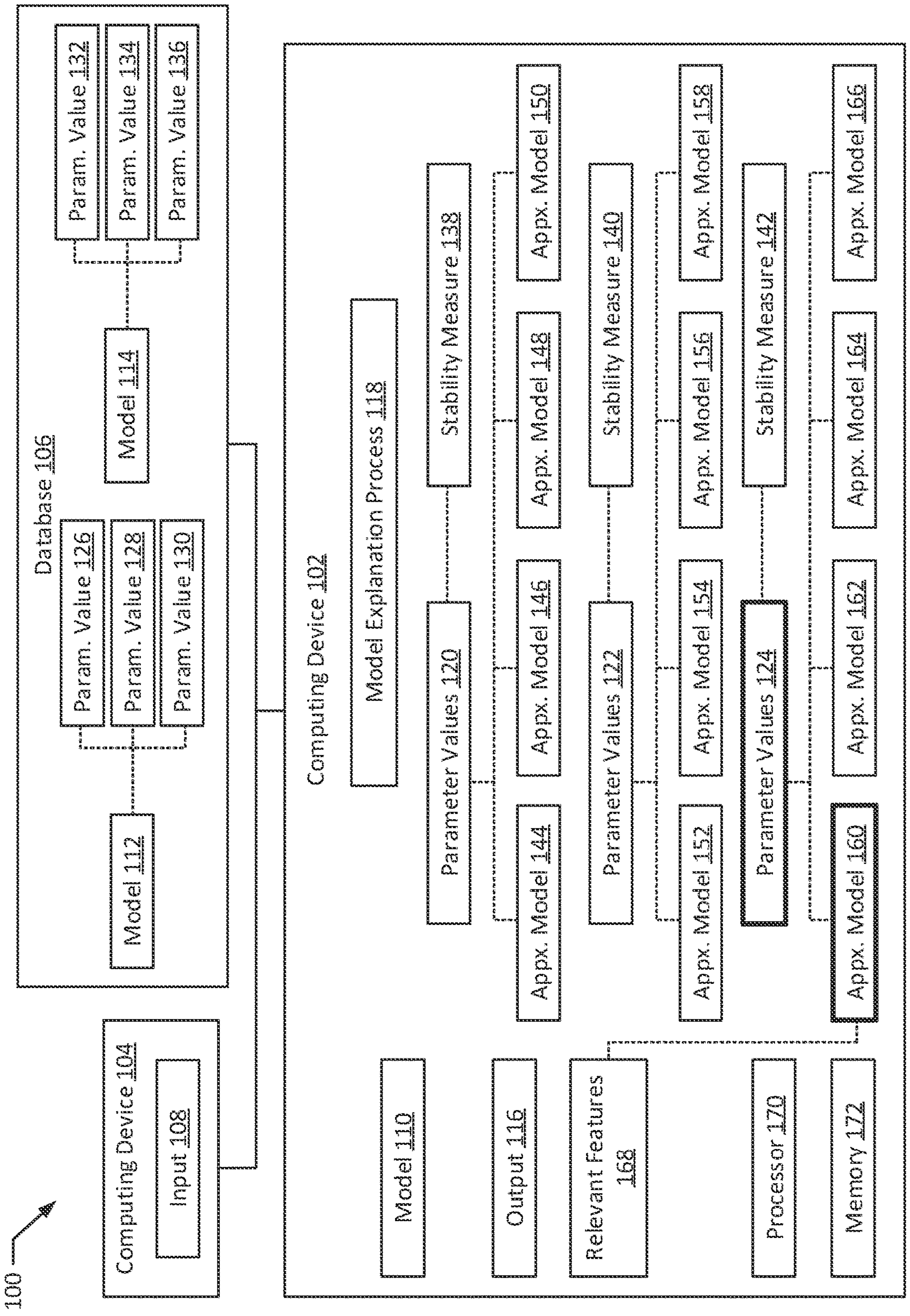
FIG. 1 illustrates a system for optimizing model explanations according to an exemplary embodiment of the present disclosure.

Users who receive an output from a machine learning model may desire an explanation of how the machine learning model arrived at the provided prediction or analysis. For example, a user may apply for a loan and may proceed through an initial screening process provided by a machine learning model. The user may provide one or more requisite pieces of information to the machine learning model, and the machine learning model may reject the user for the loan. Based on the rejection, the user may desire an explanation of why the loan was rejected. As another example, a machine learning model may be configured to predict downtimes for received software applications and functions (e.g., before deployment in a cloud computing environment). After receiving a predicted downtime, users (e.g., developers) may be interested in which portions or components of a software activity contributed most to the predicted downtime.

Existing systems to explain the output generated by a machine learning model may attempt to identify one or more factors within the input data that contributed most to the machine learning model's determination. For example, existing systems may attempt to generate an approximation for the machine learning model and, based on the approximation, may identify one or more variables that provided the greatest impact on the determined result. One such example of an existing system is LIME (Local Interpretable Model-agnostic Explanations). However, these systems are often extremely sensitive to configuration parameters (e.g., hyperparameters) used to initialize the model explanation process. If these values are not set properly, an explanation generated by the process will not be stable. In particular, multiple runs of a model explanation process, such as LIME, using the same set of incorrect configuration parameters will result in different, unreliable explanations. Thus, when improperly configured, these model explanation processes are unable to accurately or reliably explain how or why a model arrived at its conclusion.

Furthermore, properly configuring these processes is a complex and widely differentiated process. For example, different models (e.g., different types of machine learning models, different machine learning models of the same type) may require different configuration settings with the same model explanation process. Furthermore, different input and output values of the same model may require different configuration parameters. Accordingly, in many instances, the model explanation process cannot be configured upon deployment and left to execute according to this initial configuration. Instead, model explanation processes must be continually updated for the appropriate models (or portions of models) for which explanations are requested. Furthermore, even where a model explanation process is deployed to provide explanations for a single model, that model may evolve over time (e.g., as additional training data is received, as adjustments are made). Thus, even model explanation processes for individual models may need to be regularly updated and reconfigured.

Often, manually adjusting and updating the model explanation processes may not be possible. For example, deployed machine learning models may be updated or adjusted so frequently that manual reconfiguration of an associated model explanation process is not possible. As another example, requests for model explanations may be received at such a frequency that associated model explanation processes cannot be established and configured in a timely fashion. Therefore, there exists a need to automatically optimize and reconfigure model explanation processes to provide stable and accurate model explanations for deployed machine learning models.

One solution to this problem is to evaluate the output stability for model explanation processes according to multiple parameter values. In particular, the model explanation process may, in response to a request for model explanation, initially generate a plurality of approximation models according to an initial set of parameter values. A stability measure may then be calculated based on these approximation models. In certain implementations, each of the approximation models may have an associated rank of positive and/or negative features. The stability measure may be determined based on these ranks (e.g., a stability of these ranks across the multiple approximation models). The parameter values for the model explanation process may then be iteratively adjusted and further approximation models may be generated according to these updated parameter values. In certain implementations, it may only be necessary to run the model explanation process a limited number of times (e.g., five times, 10 times, 20 times) in order to determine an associated stability measure for a particular set of parameter values. This process may then be repeated until a stable set of parameter values is identified (e.g., a set of parameter values with a stability measure at or above a predetermined threshold). These parameter values may then be used to generate a model explanation (e.g., an identification of the most relevant features to a particular output generated by a deployed model).

FIG. 1 illustrates a system 100 for optimizing model explanations according to an exemplary embodiment of the present disclosure. The system 100 includes computing devices 102, 104 and a database 106. The computing device 102 may be configured to implement a model 110 (e.g., a machine learning model or other predictive model). In particular, the system 100 may be configured to receive inputs 108 for analysis by the model 110. Using the model 110, a computing device 102 may then generate an output 116 based on the received input 108. A request may then be received to generate an explanation for the output 116. In particular, the explanation may include an identification of one or more of the most relevant features 168 of the received input 108 that had the greatest impact in determining the output 116. In certain implementations, the request may be received from a user (e.g., a user of the computing device 104). Additionally or alternatively, the request may be received as an automated portion of the analysis performed by the computing device 102. In additional or alternative implementations, no request may be received, and the explanation and relevant features 168 may be generated automatically in conjunction with the computing device 102 generating the output 116. In certain instances, the input 108 may include non-numerical data (e.g., text data, image data, string data, time data, location data, mapping data).

The computing device 102 may be configured to use a model explanation process 118 in order to identify the relevant features 168. The model explanation process 118 may be configured to explain predictions or analyses (e.g., outputs 116) generated by the model. In particular, the model explanation process 118 may be configured to identify which factors of a received input 108 (e.g., which data fields/data values) most affected the output 116 generated by the model 110. Stated differently, the model explanation process 118 may be configured to identify which features of a received input 108 the model 110 was most sensitive to while generating the output 116. In various implementations, the model explanation process may include one or more of LIME, Shapley Additive Explanations (SHAP), Transformer Explainability, and the like.

The model explanation process 118 may be configured to generate one or more approximation models 144, 146, 148, 150, 152, 154, 156, 158, 160, 162, 164, 166 that approximate outputs from the model 110 for a limited input space. In particular, the approximation models 144, 146, 148, 150, 152, 154, 156, 158, 160, 162, 164, 166 may be generated to approximate the model 110 for an input space surrounding and/or near the input 108. For example, where the model explanation process 118 is a LIME process, the model explanation process 118 may be configured to generate a linear approximation of the model 110. In additional or alternative implementations, the model explanation process 118 may be configured to generate one or more other types of approximations (e.g., quadratic approximations, cubic approximations, nonlinear approximations).

Figure 2:
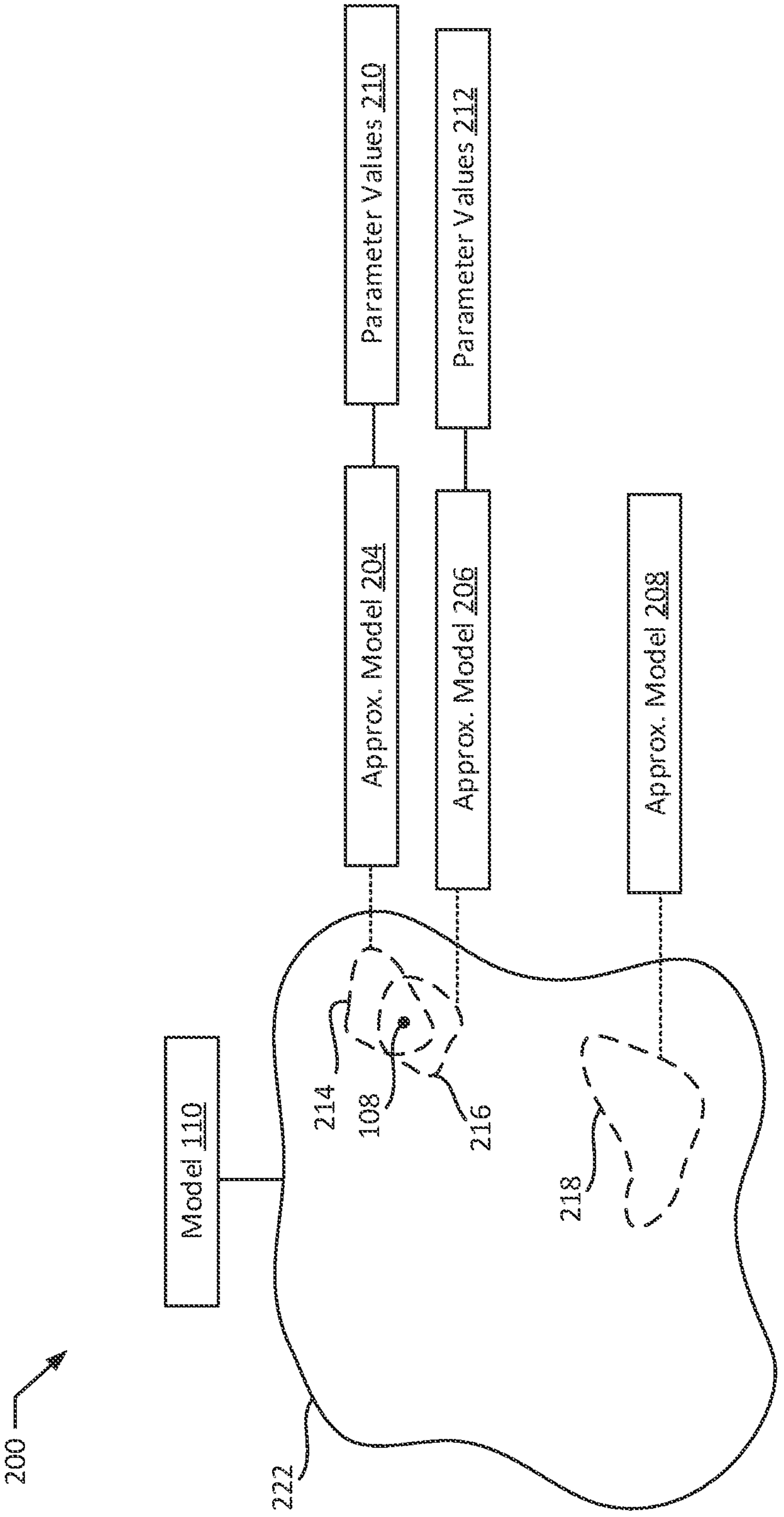
FIG. 2 illustrates an input data topology for approximation models according to an exemplary embodiment of the present disclosure.

As a more detailed example, and turning to FIG. 2, the input data topology 200 depicts an input space 222 for the model 110. The input space 222 includes the input 108, which represents a discrete set of input data received by the model 110. The input space 222 may abstractly depict or represent all possible data values that may be received and analyzed by the model 110. The topology 200 also includes a plurality of approximation models 204, 206, 208. Each of the approximation models 204, 206, 208 may be generated to approximate the performance of the model 110 for a limited portion of the input space 222. In particular, the approximation model 204 is generated to approximate the model 110 over an input space 214, the approximation model 206 is generated to approximate the model 110 over an input space 216, and the approximation model 208 is generated to approximate the model 110 over an input space 218.

As can be seen in FIG. 2, each of the input spaces 214, 216, 218 associated with the approximation models 204, 206, 208 represent a subset of the input space 222 for the model 110 (e.g., an N-dimensional input space depicted as a two-dimensional space for clarity). For example, the model 110 may be configured to approve or deny applicants for loans. In such instances, the input space 222 may include various values of loan amounts, income, assets, timely debt payments, credit score, number of applicants, and the like. Accordingly, the input spaces 214, 216, 218 may include subsets of these values (e.g., limited ranges of credit scores, income, assets). In certain implementations, input spaces 214, 216 may overlap at least partially with one another. For example, the approximation models 204, 206 may both be generated to approximate the model 110 for an input space surrounding the input 108. In particular, the approximation models 204, 206 may be generated by a model explanation process 118 according to different sets of parameter values 210, 212. As a result, the approximation models 204, 206 may approximate the model 110 over different input spaces 214, 216. Additional approximation models may also be generated for entirely separate portions of the input space 222. For example, the approximation model 208 is generated to approximate the model 110 over an input space 218 that is entirely separate the input spaces 214, 216. In one specific example, the approximation model 208 may be generated with a completely separate set of parameter values in response to a different input from the input 108. In certain instances, models generated with the same parameter values may approximate the model 110 over different input spaces.

Returning to FIG. 1, the computing device 102 may execute the model explanation process 118 according to a first set of parameter values 120. In particular, the computing device 102 may execute the model explanation process 118 multiple times according to the parameter values 120 in order to generate multiple approximation models 144, 146, 148, 150. This first plurality of approximation models 144, 146, 148, 150 may then be used to determine the stability of the model explanation process 118 for the input 108 under the parameter values 120. For example, each of the approximation models 144, 146, 148, 150 may generate a ranking of particular features (e.g., features of the input 108) that most affect the output 116 generated according to the input 108. For example, these rankings may be generated based on a sensitivity analysis of the approximation models 144, 146, 148, 150 performed by the model explanation process 118 and/or the computing device 102. Based on the rankings associated with the approximation models 144, 146, 148, 150, the computing device 102 may determine whether the model explanation process 118 produces stable outputs according to the first set of parameter values 120. In particular, the computing device 102 may compute a stability measure 138 based on the approximation models 144, 146, 148, 150 (e.g., based on the rankings associated with the approximation models 144, 146, 148, 150).

Figure 3:
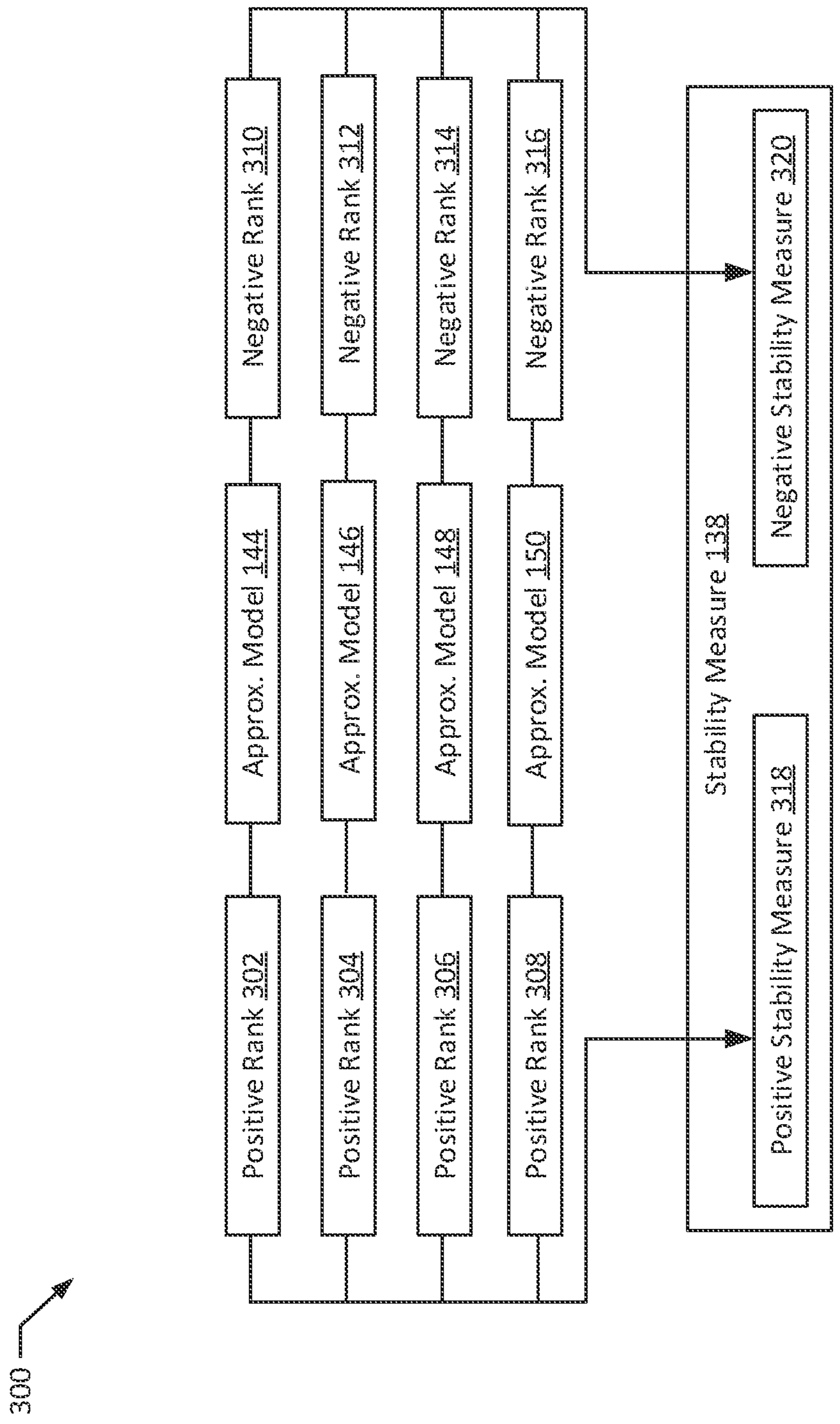
FIG. 3 illustrates a stability measure calculation procedure according to an exemplary embodiment of the present disclosure.

Turning to FIG. 3, the stability measure calculation procedure 300 depicts one such calculation that may be performed by the computing device 102 in order to compute the stability measure 138 of the model explanation process 118 according to the input 108 and the parameters 120. In particular, the stability measure 138 may be calculated based on positive ranks 302, 304, 306, 308 and negative ranks 310, 312, 314, 316 associated with each of the approximation models 144, 146, 148, 150 generated by the model explanation process 118 according to the first set of parameter values 120. Positive ranks 302, 304, 306, 308 may include a ranking of which features or data values within the input 108 had the greatest positive impact on the output 116. Positive impact may be user-defined and/or may differ depending on the scenario and type of model 110. For example, where the model 110 is configured to approve loan applications, positive features included within the positive ranks 302, 304, 306, 308 may include features that increase the likelihood that an applicant's loan application will be approved (e.g., higher income, higher credit measure). As another example, where the model 110 is configured to predict application downtime, positive features may include features that decrease the overall predicted downtime (e.g., reliable networking protocols, reduced overall execution time). Negative ranks 310, 312, 314, 316 may include a ranking of which features or data values within the input 108 had the greatest negative impact on the output 116. Negative impacts may similarly be user-defined and/or may differ depending on the scenario and type of model 110. For example, the negative impacts may be defined as the inverse of positive impacts. For example, where the model 110 is configured to approve loan applications, negative features included within the negative ranks 310, 312, 314, 316 may include features that decrease the likelihood that an applicant's loan application will be approved (e.g., a higher number of previous debts applications, higher current debt balance). As another example, where the model 110 is configured to predict application downtime, negative features may include features that increase the overall predicted downtime (e.g., dependencies on one or more unreliable libraries).

Separate stability measures may then be calculated based on the positive ranks 302, 304, 306, 308 and based on the negative ranks 310, 312, 314, 316. For example, the computing device 102 may compute a positive stability measure 318 based on the positive ranks 302, 304, 306, 308 and a negative stability measure 320 based on the negative ranks 310, 312, 314, 316. In particular, the positive stability measure 318 may be calculated as the quantity of changes between positive ranks 302, 304, 306, 308 for consecutive approximation models 144, 146, 148, 150 generated by the model explanation process 118. For example, the positive rank 302 may indicate that the relevant positive factors for the output 116 are total asset value, followed by individual income, followed by credit measure. The positive rank 304 for the next approximation model 146 may indicate that the relevant positive factors are individual income, followed by total asset value, followed by credit measure. The positive rank 306 may be identical to the positive rank 304. The positive rank 308 for the final approximation model 150 may indicate that the relevant positive factors are income, followed by credit measure, followed by total asset value. Thus, across four consecutive runs of the model explanation process 118, for four consecutive approximation models 144, 146, 148, 150, the corresponding positive ranks 302, 304, 306, 308 changed two times. Accordingly, the computing device 102 may determine a positive stability measure 318 of 2 for the parameter values 120. In additional or alternative implementations, the computing device 102 may determine the positive stability measure as the number of times that the positive ranks 302, 304, 306, 308 stay the same between consecutive approximation models 144, 146, 148, 150. In the previous example, then, the computing device 102 may determine the positive stability measure as 1 because the positive ranks. A similar process may be repeated to compute the negative stability measure 320. In particular, the negative stability measure 320 may be calculated as the quantity of times that the negative ranks 310, 312, 314, 316 change between consecutive approximation models 144, 146, 148, 150 or as the quantity of times that the negative ranks 310, 312, 314, 316 stay the same between consecutive approximation models 144, 146, 148, 150.

In additional or alternative implementations, the positive and negative stability measures 318, 320 may be calculated differently. For example, the positive stability measure 318 may be calculated based on the quantity of times that more than a predetermined number of features within the positive ranks 302, 304, 306, 308 change (e.g., four or more features change between consecutive positive ranks). As another example, the negative stability measure 320 may be calculated as a quantity of times that the top three negative features change within consecutive negative ranks 310, 312, 314, 316. In additional or alternative implementations, the positive stability measure 318 may be calculated as the quantity of unique ranks identified between all positive ranks 302, 304, 306, 308, and similarly for the negative stability measure 320 and negative ranks 310, 312, 314, 316. One skilled in the art may appreciate additional or alternative techniques for evaluating positive and negative ranks 302, 304, 306, 308, 310, 312, 314, 316 to calculate positive stability measures 318 and negative stability measures 320. All such implementations are hereby considered within the scope of the present disclosure.

The stability measure 138 may then be calculated based on the positive stability measure 318 and the negative stability measure 320. For example, the stability measure 138 may be calculated as the sum of the positive stability measure 318 and the negative stability measure 320. In additional or alternative implementations, the stability measure 138 may be calculated as a different combination of the positive stability measure and the negative stability measure 320 (e.g., as a weighted combination, weighted sum, and/or average of the positive stability measure 318 and the negative stability measure 320). In still further implementations, one skilled in the art should appreciate that one of the positive stability measure 318 and the negative stability measure 320 may be omitted. For example, the stability measure 138 may be calculated as only the positive stability measure 318 or only the negative stability measure 320.

Returning to FIG. 1, after determining the stability measure 138 for the parameter values 120, the computing device 102 may adjust the parameter values 120 to generate a second set of parameter values 122. For example, the model explanation process 118 may be a LIME process, and the first set of parameter values 120 may specify numerical or configuration values for at least one of a number of input samples used to generate an approximation model, a strictness for a proximity function that weights the input samples, a width of clusters used to sparse encode feature values, and/or a number of features to perturb for each input sample. In such instances, the computing device 102 may adjust, e.g., the strictness for the proximity function to generate the second set of parameter values 122. Additionally or alternatively, the computing device 102 may adjust more than one parameter value within the first set of parameter values 120 to generate the second set of parameter values 122.

The computing device 102 may then execute the model explanation process 118 a plurality of times based on the second set of parameter values 122 to generate a second plurality of approximation models 152, 154, 156, 158. A second stability measure 140 may be calculated for the second set of parameter values 122 based on these approximation models 152, 154, 156, 158. For example, the stability measure 140 may be calculated using techniques similar to those discussed above in connection with the stability measure 138 and/or FIG. 3.

The computing device 102 may then adjust individual parameter values within the first set of parameter values 120 and/or the second set of parameter values 122 in order to generate a third set of parameter values 12. Similar to the second set of parameter values 122, the computing device 102 may execute the model explanation process 118 multiple times according to the third set of parameter values 124 in order to generate a third plurality of approximation models 160, 162, 164, 166. The stability measure 142 may then be calculated for the parameter values 124 based on the third plurality of approximation models 160, 162, 164, 166.

Each iteration of the parameter values 120, 122, 124 may be selected by the computing device 102 according to one or more selection criteria. For example, the computing device 102 may initially randomly adjust subsequent parameter values based on the initial parameter values 120 to generate subsequent parameter values 122. For example, the computing device 102 may perform random, iterative adjustments for a predetermined number of iterations (e.g., one iteration, three iterations, five iterations, 10 iterations) and/or may perform random, iterative adjustments until a predetermined stability measure is reached (e.g., a stability measure of 5 or fewer based on 10 approximation models, a stability measure of 12 or fewer based on 20 approximation models, a stability measure of 3 or fewer based on 5 approximation models). Additionally or alternatively (e.g., after performing random, iterative adjustments), the computing device 102 may select subsequent parameter values 124 based on previous parameter values 120, 122 and previous corresponding stability measures 138, 140. For example, the computing device 102 may use one or more optimization processes to select subsequent parameter values 124. In certain instances, the optimization processes may include one or more of gradient descent processes, pattern search processes, genetic optimization processes, and the like. In certain instances, the computing device 102 may include a separate machine learning model from the model 110 that is configured to select subsequent parameter values.

Furthermore, in certain implementations, the first set of parameter values 120 utilized by the computing device 102 may be selected as a predetermined (e.g., default, user-specified) set of parameter values for the model explanation process 118. In additional or alternative implementations, the computing device 102 may select the parameter values 120 based on a previous optimization operation performed for the model explanation process 118. For example, the database 106 stores models 112, 114 in association with parameter values 126, 128, 130, 132, 134, 136. The parameter values 126, 128, 130, 132, 134, 136 may be resulting optimized parameter values from previous optimization operations performed (e.g., by the computing device 102, by a different computing device) for the models 112, 114. In such implementations, the computing device 106 may select from among parameter values stored within the database 106 in association with the model 110 to serve as the first set of parameter values 120. For example, parameter values 126, 128, 130, 132, 134, 136 stored within the database may be stored in association with an input and/or output for which the corresponding optimization operation was performed. In such instances, the computing device 102 may select the first set of parameter values 120 from within the database 106 by identifying the most similar input and/or output to the input 108 and the output 116 (e.g., by performing a nearest neighbor search based on one or both of the input 108 and the output 116). After identifying a corresponding set of parameter values within the database 106, the computing device 102 may proceed with optimizing the model explanation process 118 by utilizing the selected parameter values as the first set of parameter values 120.

Although three sets of parameter values 120, 122, 124 are depicted, in practice, the computing device 102 may select and evaluate more than three sets of parameter values. For example, the computing device 102 may continue to iteratively adjust parameter values and test the resulting sets of parameter values until one or more stopping conditions occur. Stopping conditions may include a maximum number of parameter values tested (e.g., 25, 50, 100, 1000, 10,000), a stability measure at or below a predetermined threshold (e.g., zero, one, two, five), and the like. Similarly, although four approximation models 144, 146, 148, 150, 152, 154, 156, 158, 160, 162, 164, 166 are depicted corresponding to each of the depicted sets of parameter values 120, 122, 124, in practice, more or fewer approximation models may be generated for each set of parameter values (e.g., 2, 3, 5, 10, 20, and/or 50 approximation models). In practice, however, the present techniques (and stability measure calculations) may, in practice require fewer executions than other potential optimization techniques. For example, for each iteration and set of parameter values, the computing device 102 may only be required to generate 10 or fewer approximation models to determine a reliable stability measure.

Upon reaching one or more stopping conditions, the computing device 102 may select from between the different sets of parameter values 120, 122, 124 that were created and tested. For example, the computing device 102 may select the parameter values 124 that are associated with the highest stability measure 142 (or lowest stability measure 142, depending on formulation). In the depicted example, the parameter values 120 may have a stability measure 138 of 1, the parameter values 122 may have a stability measure 140 of 3, and the parameter values 124 may have a stability measure 142 of 6. Accordingly, the computing device 102 may select the third set of parameter values 124 for use in generating the model explanation and identifying the relevant features 168 of the model 110 for the input 108.

The relevant features 168 may then be identified based on one or more of the approximation models 160, 162, 164, 166 associated with the selected parameter values 124. For example, the relevant features 168 may be selected as one or more positive ranks and/or negative ranks associated with at least one of the approximation models 160, 162, 164, 166. As another example, the relevant features 168 may be selected as the most common positive rank and/or negative rank among the approximations models 160, 162, 164, 166.

The relevant features 168 may then be provided to a requesting user. For example, the relevant features 168 may be transmitted to the computing device 104 from which the input 108 was received. Additionally or alternatively, the request for the relevant features 168 may be received from another computing device. Accordingly, the relevant features 168 may additionally or alternatively be provided to the other computing device. In still further implementations, the relevant features 168 may be stored in a database (not depicted).

In certain implementations, the relevant features 168 and be prepared in a standardized format, such as tabular format. In one specific example, the relevant features 168 may be prepared in a Decision Model and Notation (DMN) format for use with Red Hat® Decision Manager.

One or more of the computing devices 102, 104 and the database 106 may be implemented by a computer system. For example, the computing device 102 includes a processor 170 and a memory 172. The processor 170 and memory 172 may implement one or more aspects of the computing device 102. For example, the memory 172 may store instructions which, when executed by the processor 170, may cause the processor 170 to perform one or more operational features of the computing device 102. The processor 170 may be implemented as one or more central processing units (CPUs), field programmable gate arrays (FPGAs), and/or graphics processing units (GPUs) configured to execute instructions stored on the memory 172. The computing device 104 and the database 106 may similarly include one or more processors and/or memories configured to implement one or more operational features. Additionally, the computing devices 102, 104 and the database 106 may be configured to communicate using a network. For example, the computing devices 102, 104 and the database 106 may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1, and/or a global network (e.g., the Internet).

Figure 4:
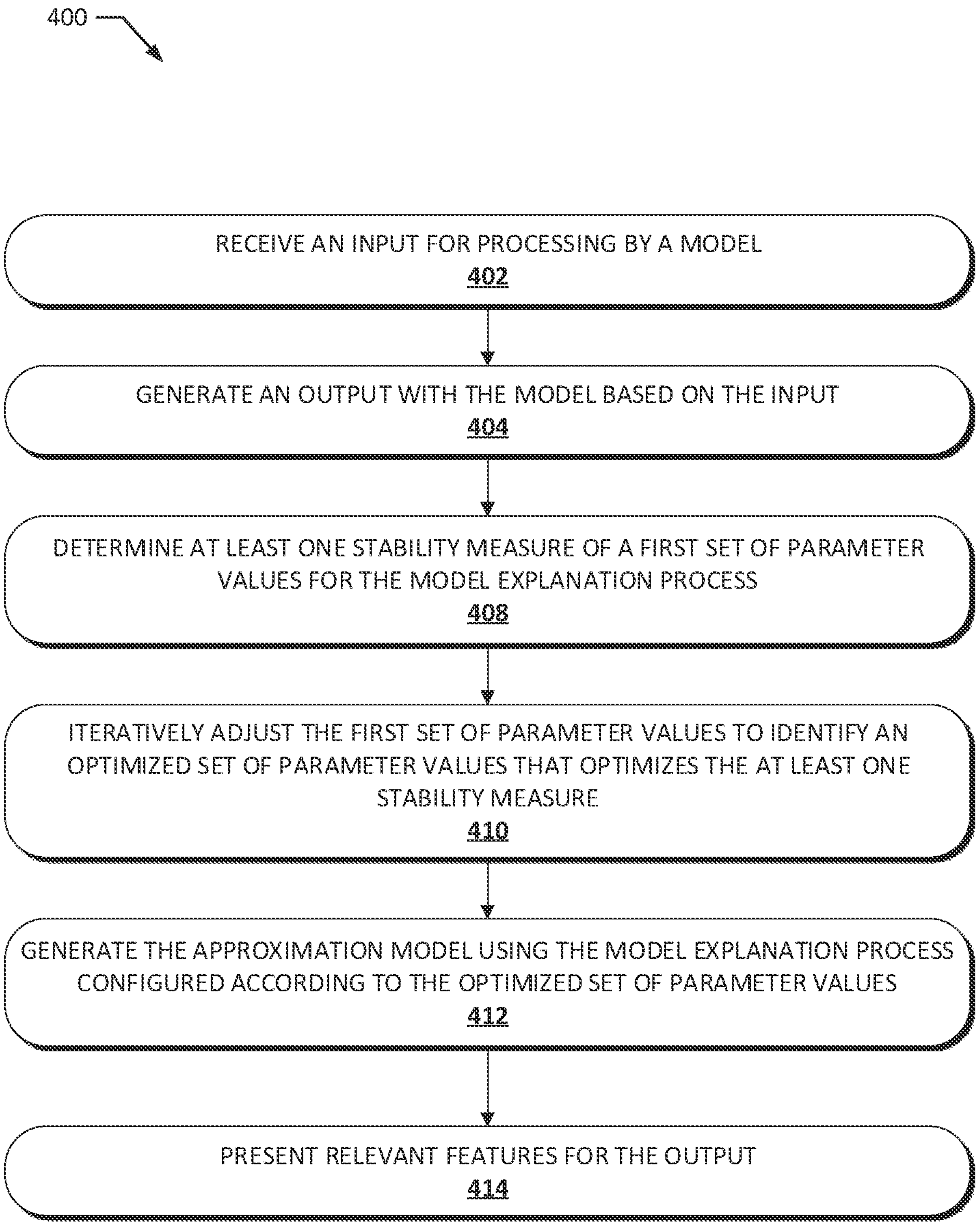
FIG. 4 illustrates a method for optimizing model explanations according to an exemplary embodiment of the present disclosure.

FIG. 4 illustrates a method 400 for optimizing model explanations according to an exemplary embodiment of the present disclosure. In particular, the method 400 may be performed to generate an output using a machine learning model for a received input (e.g., received input data), and to identify and present one or more relevant features to the output. The method 400 may be implemented on a computer system, such as the system 100. For example, the method 400 may be implemented by the computing device 102. The method 400 may also be implemented by a set of instructions stored on a computer readable medium that, when executed by a processor, cause the computer system to perform the method 400. For example, all or part of the method 400 may be implemented by the processor 170 and the memory 172. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving an input for processing by a model (block 402). For example, the computing device 102 may receive an input 108 for processing by a model 110. The input 108 may be received from another computing device 104. For example, the input 108 may be received from a user associated with the computing device 104. Additionally or alternatively, the input 108 may be received from a database implemented by the computing device 104. The input 108 may represent one or more input data sets and data values for use by the model 110 and generating output 116. For example, the model 110 may be configured to predict a failure rate for a function over a certain operational period and the input 108 may specify one or more characteristics of the function (e.g., dependencies, required resources, expected request rate).

An output may be generated with the model based on the input (block 404). For example, the computing device 102 may generate an output 116 using the model 110 based on the received input 108. Continuing the previous example, the model 110 may predict that the function described within the input 108 will have a downtime of one second per hour of uptime. For certain applications, this level of downtime may be inadequate. Accordingly, a user may desire an explanation of which portions of the described function contribute most to the predicted downtime. To respond to this inquiry, the computing device 102 may utilize a model explanation process 118. But, as explained above, the analysis performed by such processes may be unstable and may therefore require optimization to ensure that the relevant factors 168 are correctly and reliably identified.

At least one stability measure of a first set of parameter values for the model explanation process may be determined (block 408). For example, the computing device 102 may determine a first stability measure 138 of a first set of parameter values 120 for the model explanation process 118. As explained further above, the first stability measure 138 may be calculated based on a plurality of approximation models 144, 146, 148, 150 generated by multiple executions of the model explanation process 118 according to the first set of parameter values 120. In particular, the first stability measure 138 may be calculated based on the stability of positive and negative ranks of features within corresponding approximation models 144, 146, 148, 150. In certain implementations, the first set of parameter values 120 may be selected based on a previous optimization of the model explanation process 118. For example, a database 106 may store previous parameter values 126, 128, 130, 132, 134, 136 in association with models 112, 114. In such instances, the first set of parameter values 120 may be selected as a set of parameter values associated with the model 110 within the database 106 (e.g., based on a nearest neighbor search, as explained above).

The first set of parameters may be iteratively adjusted to identify an optimized set of parameter values that optimizes the at least one stability measure (block 410). For example, the computing device 102 may iteratively adjust the first set of parameter values 120 to identify an optimized set of parameter values 124 that optimizes (e.g., maximizes or minimizes) the at least one stability measure 138, 142. Iteratively adjusting the first sets of member values 120 may include generating multiple additional sets of parameter values 122, 124. Stability measures 140, 142 may then be calculated for each of the additional sets of parameter values 122, 124. In particular, as explained above, approximation models 152, 154, 156, 158, 160, 162, 164, 166 be generated for each of the additional sets of parameter values 122, 124 and may be used to determine the stability measures 140, 142. The stability measures 140, 142 and previous sets of parameter values 120, 122, 124 may be used to select one or more adjustments for each iteration of the parameter values, as explained above and further explained below in connection with the method 500. This iterative adjustment may continue until a stopping condition is reached, at which point the optimized set of parameter values may be selected from among the plurality of sets of parameter values 120, 122, 124. For example, the optimize set of parameter values may be selected as the set of parameter values 124 associated with the best or optimal stability measure 142 (e.g., the largest stability measure and/or the smallest stability measure, depending on the implementation).

An approximation model may be generated using the model explanation process configured according to the optimized set of parameters (block 412). For example, the computing device 102 may generate an approximation model 160 using the model explanation process 118 configured according to the optimized set of parameter values 124. In certain implementations, the approximation model 160 may be newly-generated after identifying the optimized set of parameter values 124. For example, after identifying the parameter values 124 as the optimized set of parameter values, the computing device 102 may execute the model explanation process 118 once more to generate another approximation model. In additional or alternative implementations, the approximation model may be selected from among one of the approximation models 160, 162, 164, 166 that were generated previously using the model explanation process 118 and the parameter values 124. In still further implementations, more than one approximation model 160, 162 may be selected from among the approximation models 160, 162, 164, 166 generated previously by the model explanation process 118 according to the parameter values 124.

The relevant features for the output may be presented (block 414). For example, relevant features 168 for the output 116 based on the approximation model 160 and the input 108 may be presented. The approximation model 160 generated or selected at block 412 may be used to identify the relevant features 168. For example, the relevant features 168 may include a predetermined number of features from a positive rank and/or a negative rank associated with the approximation model 160. In additional or alternative implementations, the relevant features 168 may be selected from feature ranks (e.g., positive ranks, negative ranks) associated with multiple approximation models 160, 162, 164, 166. For example, the relevant features 168 may be selected based on the most common positive ranking of features among the approximation models 160, 162, 164, 166 (e.g., as the top 3 features in the most common positive ranking). The relevant features 168 may additionally or alternatively be selected based on the most common negative ranking of features. In certain implementations, the relevant features 168 may include both positive relevant features (e.g., factors that reduce function downtime) and negative relevant features (e.g., factors that increase function downtime). Presenting the relevant features 168 may include providing the relevant features to a requesting computing device (e.g., the computing device 104 or another computing device). In certain implementations, as explained above, the relevant features 168 may be prepared and/or provided in a tabular format, such as a DM N format, before being presented. In certain implementations, corrective action may be taken based on the received relevant features 168. For example, one or more negative factors indicated in the relevant features 168 that increase a function's downtime may be corrected (e.g., removing dependencies that are likely to increase downtime). In certain instances, this corrective action may be performed automatically (e.g., by a computing device receiving the relevant features 168). Additionally or alternatively, recommendations may be generated for a user based on the relevant features 168. For example, a developer creating a function identified in the input 108 may receive one or more recommendations (e.g., identifying an error-prone networking protocol used by the function, identifying downtime-increasing dependencies) generated by a computing device that receives the relevant features 168. In particular, generating the recommendations may include providing indications of positive and/or negative features identified by the relevant features 168.

Accordingly, the method 400 is able to improve the quality of relevant features 168 identified by a computing device using a model explanation process 118. In particular, by iteratively adjusting parameter values for the model explanation process based on stability measures, the computing device 102 is able to automatically arrive at a configuration for the model explanation process that produces reliable and accurate approximation models. These approximation models may then be used to identify more accurate relevant features for a received input and corresponding output than other automated systems, which may rely on model explanation processes that are preconfigured and thereby more prone to unstable and inaccurate analyses. Improved relevant feature identification provides practical improvements to associated computing devices. In particular, the described stability measures may be reliably calculated based on a relatively low number of executions for the model explanation process. As explained above, this reduces overall processing power required at each iteration, which both frees up system resources and allows for quicker iteration and testing of parameter values and thereby quicker optimization of the model explanation process for a particular input. Alternatively, the method 400 may enable optimization operations/systems for model explanation processes to be implemented with fewer computer hardware (e.g., fewer processors/processor cores, fewer GPUs). Furthermore, where the initial set of parameter values are selected based on previously-stored parameter values, the overall number of iterations may also be reduced, enabling even quicker optimization of the model explanation process for a particular input. Furthermore, because the method 400 does not require a training model to generate explanations of the relevant features (or to tune the model explanation process), the method 400 enables optimization of model explanation processes for models that use non-numerical data.

Figure 5:
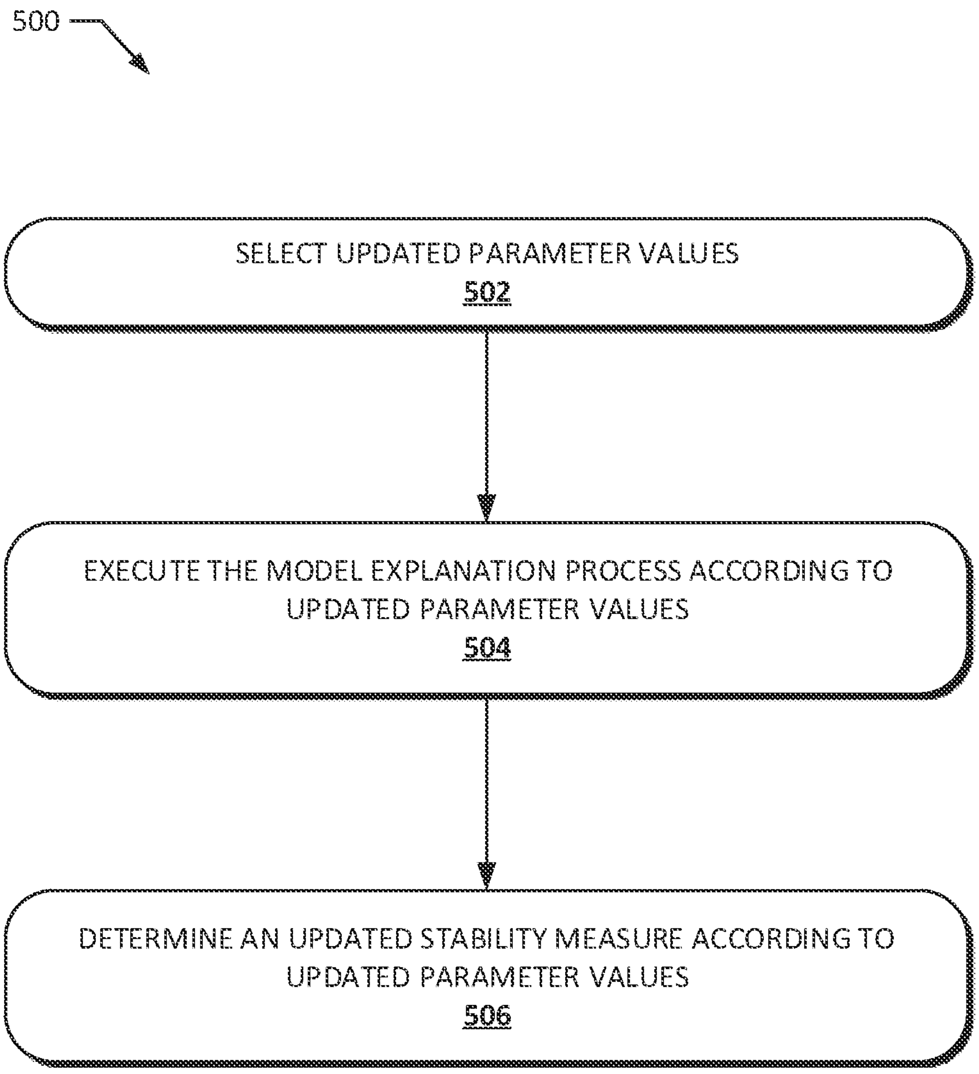
FIG. 5 illustrates a method for iteratively adjusting parameter values of a model explanation process according to an exemplary embodiment of the present disclosure.

FIG. 5 illustrates a method 500 for iteratively adjusting parameter values of a model explanation process according to an exemplary embodiment of the present disclosure. In particular, the method 500 may be performed to iteratively adjust parameter values in an optimization procedure for a model explanation process 118. For example, the method 500 may be an exemplary implementation of block 410 of the method 400. The method 500 may be implemented on a computer system, such as the system 100. For example, the method 500 may be implemented by the computing device 102. The method 500 may also be implemented by a set of instructions stored on a computer readable medium that, when executed by a processor, cause the computer system to perform the method 500. For example, all or part of the method 500 may be implemented by the processor 170 and the memory 172. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with selecting updated parameter values (block 502). For example, the computing device 102 may select updated parameter values 122 based on a previous set of parameter values 120 for the model explanation process 118. In certain implementations, as explained above, the updated parameter values 122 may initially be selected by randomly updating or altering one or more parameter values within the initial set of parameter values 120. However, for later iterations (e.g., when selecting updated parameter values 124), the updated parameter values may be selected according to one or more optimization processes, as explained above. In still further implementations, the updated parameter values may be selected from among parameter values stored within a database 106 for previous optimizations of the model explanation process 118. For example, where there were multiple matching or corresponding parameter values within the database 106 for the model 110, the input 108, and/or the alpha 116, the updated parameter values may be selected from among the multiple matching sets of parameter values (e.g., excluding the parameter values 120 initially selected).

The model explanation process may be executed according to the updated parameter values (block 504). For example, the computing device 102 may execute the model explanation process 118 according to the updated parameter values 120. In certain implementations, the computing device 102 may be configured to execute the model explanation process 118 fora predetermined number of times (e.g., 5 times, 10 times, 15 times, 20 times, 50 times). Each execution may result in an approximation model 152, 154, 156, 158 corresponding to the parameter values 122. In certain instances, each of the approximation models 152, 154, 156, 158 may have an associated rank of features (e.g., features of the input 108) that most affected the output 116, such as a positive rank and/or a negative rank.

An updated stability measure may be determined according to the updated parameter values (block 506). For example, the computing device 102 may determine an updated stability measure 140 according to the updated parameter values 122. In particular, the updated stability measure 140 may be calculated based on the approximation models 152, 154, 156, 158 generated by the model explanation process 118 according to the parameter values (e.g., at block 504). In particular, and as further detailed above, the stability measure 140 may be based on the stability of positive ranks and/or negative ranks associated with each of the approximation models 152, 154, 156, 158. For example, the computing device 102 may calculate a positive stability measure and a negative stability measure based, respectively, on the positive ranks and negative ranks. The stability measure 138 may then be calculated as a combination of the positive stability measure and the negative stability measure, as explained further above.

In certain implementations, the method 500 may be repeated multiple times while optimizing the model explanation process 118 for the input 108 and the output 116. For example, after determining the updated stability measure at block 506, processing may return to block 502 to select another updated set of parameter values. As a specific example, after determining the stability measure 140 for the parameter values 122 at block 506, the computing device 102 may return to block 502 to select an updated set of parameter values 124. The computing device 102 may then repeat the method 500 to generate the approximation models 160, 162, 164, 166 using the model explanation process 118 according to the parameter values 124 (e.g., at block 504). The computing device 102 may then determine the stability measure 142 according to the parameter values 124 at block 506.

The method 500 accordingly allows computing devices 102 to automatically and iteratively adjust parameter values. This facilitates the automated optimization of the method 400 by proceeding through a plurality of parameter values in order to select and identify parameter values that results in stable approximation models and stable relevant features 168 for received inputs.

Figure 6:
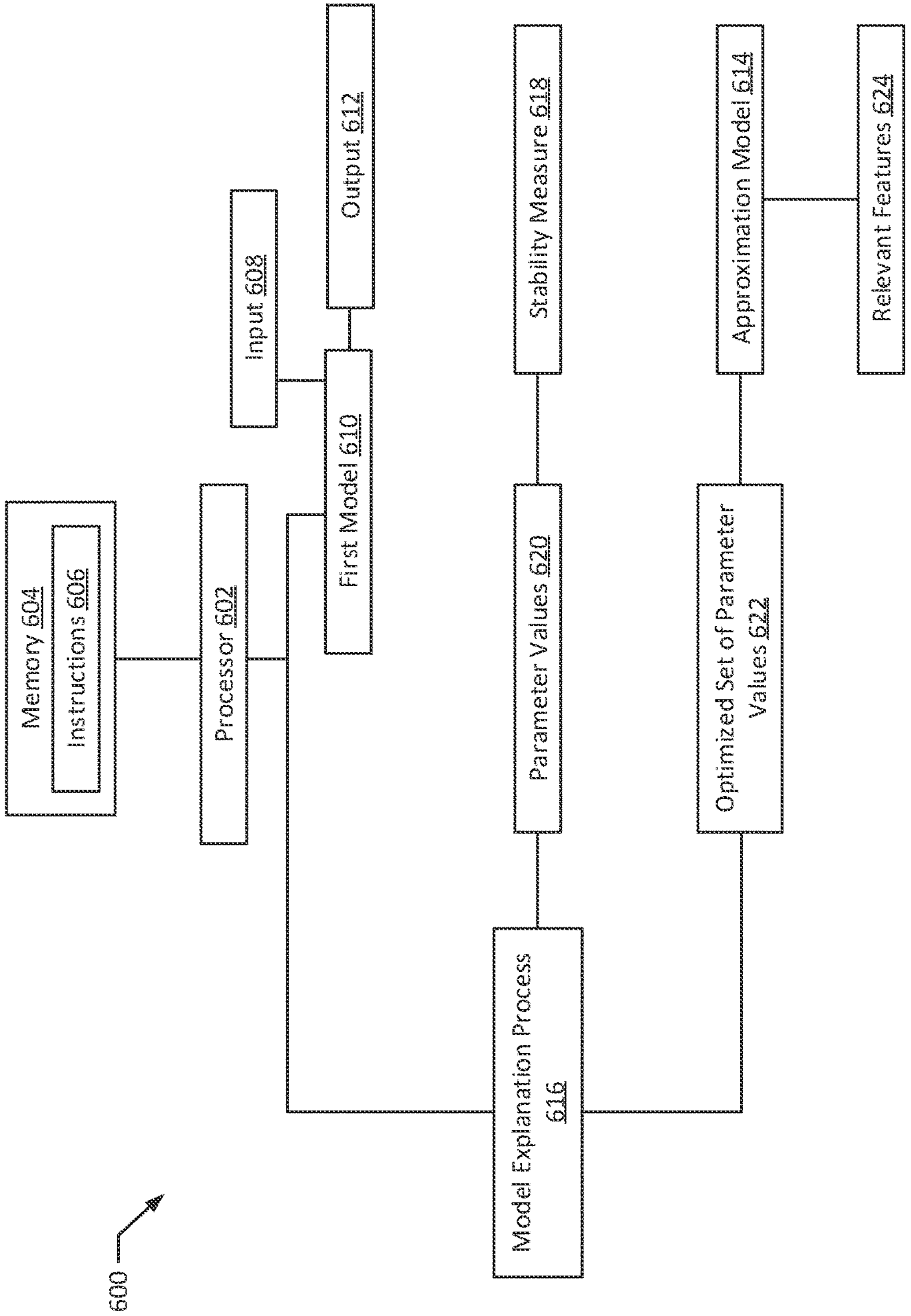
FIG. 6 illustrates a system according to an exemplary embodiment of the present disclosure.

FIG. 6 illustrates a system 600 according to an exemplary embodiment of the present disclosure. The system 600 includes a processor 602 and a memory 604. The memory 604 stores instructions 606 which, when executed by the processor 602, cause the processor 602 to receive an input 608 for processing by a first model 610 and to generate an output 612 with the first model 610 based on the input 608. The instructions 606 may further cause the processor 602 to generate an approximation model 614 using a model explanation process 616 by determining at least one stability measure 618 of a first set of parameter values 620 for the model explanation process 616. The processor 602 may further iteratively adjust the first set of parameter values 620 to identify an optimized set of parameter values 622 that optimizes the at least one stability measure 618 and generate the approximation model 614 using the model explanation process 616 configured according to the optimized set of parameter values 622. One or more relevant features 624 for the output 612 based on the approximation model 614 and the input 608 may be presented.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:

detecting, by a processor, a triggering event for obtaining an explanation of an output from a target machine-learning model; and in response to detecting the triggering event:

executing, by the processor, a model explanation process configured with a first set of parameter values to generate a first set of approximation models;

generating, by the processor, an optimized set of parameter values that optimizes at least one stability measure associated with the first set of parameter values by performing an iterative process in which the model explanation process is repeatedly re-executed using varying parameter values until a stopping condition is satisfied, wherein each iteration of the iterative process includes re-executing the model explanation process using an updated set of parameter values to generate one or more corresponding updated approximation models; and executing, by the processor, a particular approximation model that is generated by executing the model explanation process using the optimized set of parameter values, wherein the particular approximation model is configured to output one or more relevant input features usable to explain the output from the target machine-learning model.

2. The method of claim 1, wherein the at least one stability measure is determined based on the stability of a rank of features according to the model explanation process.

3. The method of claim 2, wherein the at least one stability measure is determined as a quantity of times the rank stays the same between consecutive approximation models for a predetermined number of executions of the model explanation process.

4. The method of claim 2, wherein the at least one stability measure includes a positive stability measure determined for positive features that increase the output and a negative stability measure determined for negative features that decrease the output.

5. The method of claim 2, wherein the rank of features is an ordering of features by impact on the output according to the model explanation process.

6. The method of claim 1, wherein the model explanation process is a Local Interpretable Model-agnostic Explanation (LIME) process.

7. The method of claim 6, wherein the first set of parameter values includes at least one of a number of input samples used to generate an approximation model, a strictness for a proximity function that weights the input samples, a width of clusters used to sparse encode feature values, or a number of features to perturb for each input sample.

8. The method of claim 1, wherein the first set of parameter values are selected as a predetermined set of parameter values.

9. The method of claim 8, wherein the predetermined set of parameter values are selected based on a previously-generated approximation model for the target machine-learning model.

10. The method of claim 1, wherein the one or more relevant input features for the output of the target machine-learning model are provided in a decision model and notation format.

11. The method of claim 1, wherein the output is generated by the target machine-learning model based on an input that includes non-numerical data.

12. A system comprising:

a processor; and a memory storing instructions which, when executed by the processor, cause the processor to perform operations including:

detecting a triggering event for obtaining an explanation of an output from a target machine-learning model; and in response to detecting the triggering event:

executing a model explanation process configured with a first set of parameter values to generate a first set of approximation models;

generating an optimized set of parameter values that optimizes at least one stability measure associated with the first set of parameter values by performing an iterative process in which the model explanation process is repeatedly re-executed using varying parameter values until a stopping condition is satisfied, wherein each iteration of the iterative process includes re-executing the model explanation process using an updated set of parameter values to generate one or more corresponding updated approximation models;

executing a particular approximation model that is generated by executing the model explanation process using the optimized set of parameter values, wherein the particular approximation model is configured to output one or more relevant input features usable to explain the output from the target machine-learning model; and presenting the one or more relevant input features as at least part of the explanation of the output of the target machine-learning model.

13. The system of claim 12, wherein the at least one stability measure is determined based on the stability of a rank of features according to the model explanation process.

14. The system of claim 13, wherein the at least one stability measure is determined as a quantity of times the rank stays the same between consecutive approximation models for a predetermined number of executions of the model explanation process.

15. The system of claim 13, wherein the at least one stability measure includes a positive stability measure determined for positive features that increase the output and a negative stability measure determined for negative features that decrease the output.

16. The system of claim 13, wherein the rank of features is an ordering of features by impact on the output according to the model explanation process.

17. The system of claim 12, wherein the model explanation process is a Local Interpretable Model-agnostic Explanation (LIME) process.

18. A non-transitory, computer-readable medium storing instructions which, when executed by a processor, cause the processor to perform operations including:

detecting a triggering event for obtaining an explanation of an output from a target machine-learning model; and in response to detecting the triggering event:

executing a model explanation process configured with a first set of parameter values to generate a first set of approximation models;

generating an optimized set of parameter values that optimizes at least one stability measure associated with the first set of parameter values by performing an iterative process in which the model explanation process is repeatedly re-executed using varying parameter values until a stopping condition is satisfied, wherein each iteration of the iterative process includes re-executing the model explanation process using an updated set of parameter values to generate one or more corresponding updated approximation models; and executing a particular approximation model that is generated by executing the model explanation process using the optimized set of parameter values, wherein the particular approximation model is configured to output one or more relevant input features usable to explain the output from the target machine-learning model.

19. The system of claim 12, wherein the first set of parameter values are selected as a predetermined set of parameter values.

20. The system of claim 19, wherein the predetermined set of parameter values are selected based on a previously-generated approximation model for the target machine-learning model.

* * * * *